Feb. 26, 1929.
J. EDGAR
1,703,101
CLUTCH
Filed July 16, 1924
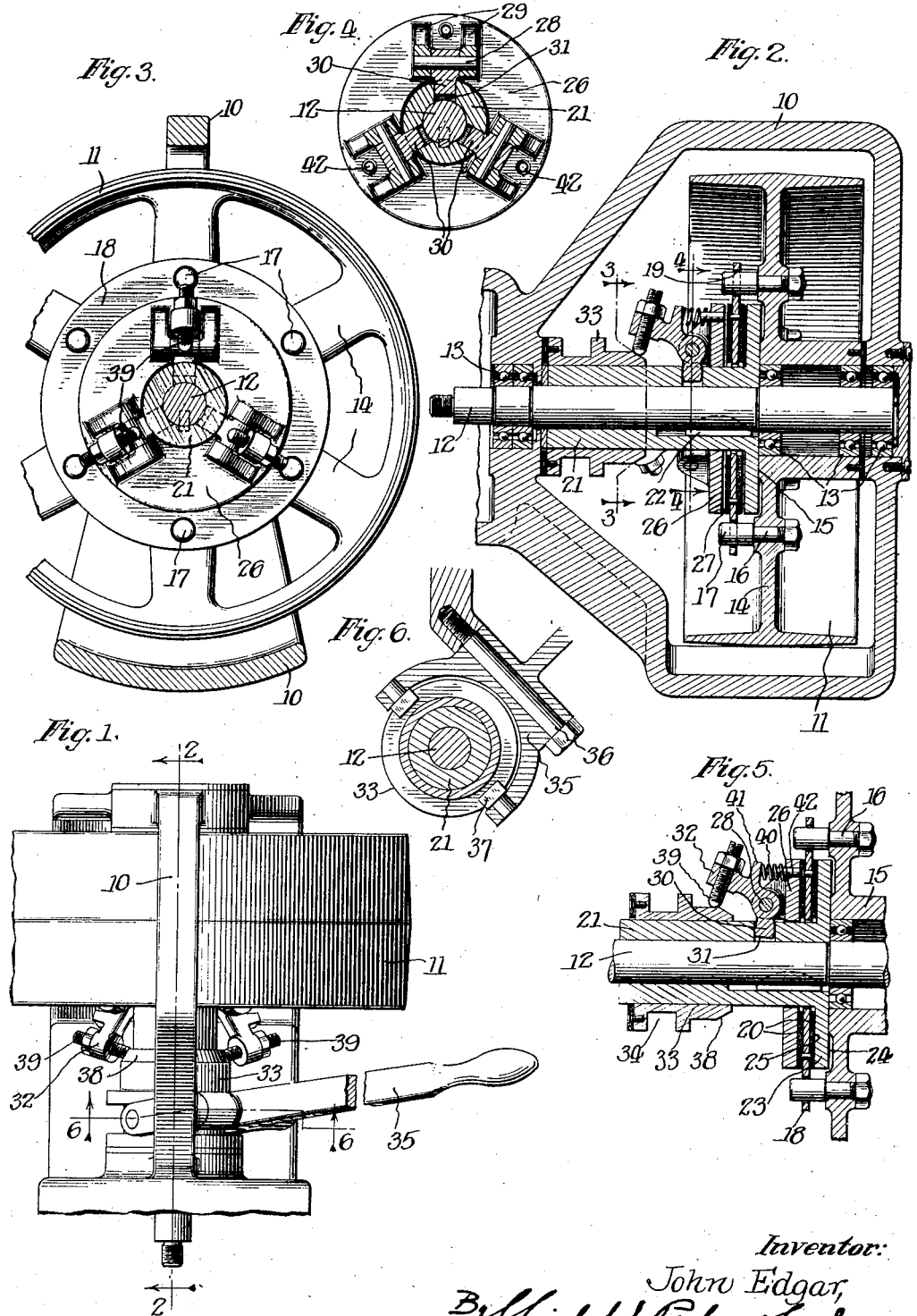
Inventor:
John Edgar,
By Kendall, Parker & Carlson
Att'ys.

Patented Feb. 26, 1929.

1,703,101

UNITED STATES PATENT OFFICE.

JOHN EDGAR, OF ROCKFORD, ILLINOIS, ASSIGNOR TO BARBER-COLMAN COMPANY, OF ROCKFORD, ILLINOIS, A CORPORATION OF ILLINOIS.

CLUTCH.

Application filed July 16, 1924. Serial No. 726,262.

This invention relates to friction clutches and particularly to a means for insuring the release of the friction elements therein. Heretofore there has been a tendency in prior clutches for the friction surfaces to adhere or stick upon release of the clutch upon withdrawal of the actuating means, causing a spinning or dragging of a driven member after release is desired. Such action is due to sticking of the friction surfaces or to gumming of the parts of the clutch by grease and dirt so that the natural tendency to separate is repressed.

The primary object of this invention is to provide a friction clutch having a means for effectually, quickly or definitely effecting a release of the friction elements.

It is another object of the invention to provide a releasing means of the character indicated which is contained within the moving clutch parts independently of the operating lever thereof.

In the drawings, I have illustrated one type of clutch embodying the principles of the invention for the purpose of illustrating the same, it being understood that other types may embody the principle of the invention, as will more fully appear hereinafter from the following description.

In the drawings, Figure 1 is a general elevational view of the clutch.

Fig. 2 is a cross sectional view of the clutch of Fig. 1 along the line 2—2 thereof, showing the friction elements in separated relation.

Fig. 3 is a view of the clutch taken substantially along line 3—3 of Fig. 2.

Fig. 4 is a view of the friction plate and mechanism along the line 4—4 of Fig. 2.

Fig. 5 is a fragmentary sectional view of a portion of the structure shown in Fig. 2 showing the friction elements in engaging position.

Fig. 6 is a cross section of the clutch along the line 6—6 of Fig. 1.

The clutch of the drawings is shown mounted in a frame 10. Pulley 11 at one end of the clutch constitutes, in the present instance, the driving member. A driven shaft 12 is mounted in the other end, there being suitable ball bearings 13 provided throughout, which, however, form no part of the invention. The driving pulley 11 has a central spider portion 14 and a hub 15. Bolts 16 mounted in the spider arms 14 have elongated cylindrical heads 17 upon which rides freely a circular plate 18, the plate being provided with holes 19 which fit over the heads 17. Friction disks 20 are placed on both sides of the plate 18 which, in the idling of the clutch, turns freely with the pulley 11.

The driven shaft 12 carries a sleeve 21 made rigid with the shaft by a key 22. The sleeve is provided with a terminal flange plate 23 which abuts the hub 15 of the pulley 11 at the outer or terminal face 24 of the plate. The inner face 25 of this plate is opposed to the friction disk 20 on plate 18. An annular plate 26 substantially like the flange 23 is axially movable on sleeve 21 and its face 27 is arranged to contact the other friction disk 20. Thus, the friction plate 18 is loosely mounted between the fixed plate 23 and the movable pressure plate 26.

Suitable means is provided for clamping the friction plate between the above described plates adjacent thereto, the releasing device being embodied in such means. A bell crank motion is used to operate the plate 26, several bell cranks being provided which are pivoted at 28 to lugs 29 upon the plate 26. One arm 30 of each bell crank has arcuate sides which ride against the sides of a pivot hole 31 in the sleeve 21. The other arm 32 of each bell crank is suitably operated to move the plate 26 axially of the sleeve, the arm 30 acting as a sliding pivot to permit this action. For moving the bell crank arms 32 an operating means is provided which is positively acting in one direction on the bell cranks and which is capable of withdrawal therefrom in the opposite direction. Such a means is herein provided as a movable cam means comprising, a cylindrical collar 33 idly mounted on the sleeve 21, the collar having an annular groove 34 therein. A clutch lever 35 pivoted in the frame at 36 has headed pins 37 which ride in the groove. Operation of the lever moves the collar in under the arms 32 to raise them. The end of the collar is beveled at 38, and each arm 32 has an adjustable screw 39 which rides on and off the beveled surface of the collar to effect operation of the clutch.

In the structure so far described, the withdrawal of the collar 33 permits the friction surfaces described to separate. In case of adherence or sticking of the plates or because of excessive friction elsewhere, the plates may not readily part of their own accord. Means are added to the above structure to insure the desired separation. This is effected by placing a spring 40 between the plate 26 and each arm 32, a lug 41 on the arm and a pin 42 in the plate being provided for locating the spring.

In operation of the device, it will be observed that each bell crank having arms 30 and 32 is pivotally slidable in the hole 31 of the sleeve 21. The pivot 28 and the plate 26 bearing a fixed relation, move together in an axial direction the same distance. The lug 41, however, is at a greater radial distance from the pivoted center of arm 30 than is the pivot 28, and it therefore moves a proportionately greater distance than does the pivot 28. This results in angular motion of the arm 32 toward and away from the plate 26 as the latter moves. The insertion of the springs 40, between the lugs 41 and the plate 26 tends to force the separation of the lugs 41 and the plate 26, and to effect this result, the plate 26 must be withdrawn from the friction plate 18.

It will be observed that in the running position of the clutch (Fig. 5) the springs 40 exert their action against the cylindrical surface of collar 33, producing no results. In the idle position (Fig. 2) the springs exert their action on the tapered end 38 with a cam action to maintain the collar away from the running position. Also in this latter position the springs serve to overcome any tendency of the arms 32 to swing upwardly under the action of centrifugal force and thereby cause the clutch surfaces to engage.

While I have described in detail the clutch disclosed in the drawings, it is to be understood that the invention is not limited to such disclosure and that it may be embodied in other structures in a variety of ways as will be clear to those skilled in the art. It is the aim in the appended claim to define the invention in its broadest scope limited only by the prior art.

I claim as my invention:

A friction clutch comprising, in combination, a rotary member presenting a friction surface, an axially movable pressure member presenting a friction surface, a rotary friction member disposed between said surfaces, said two first mentioned members being arranged to effect a frictional engagement with said friction member for simultaneous rotation, an arm pivoted to said movable pressure member, said arm having a free end fixed against movement axially of the rotary member, whereby motion of the arm relative to the movable member effects motion of the movable member, means acting to move said arm positively only in one direction whereby to cause frictional engagement, and expansive spring means between said arm and said movable pressure member to compel motion in the other direction on withdrawal of said means.

In testimony whereof, I have hereunto affixed my signature.

JOHN EDGAR.